(12) United States Patent
Takeuchi et al.

(10) Patent No.: US 9,455,647 B2
(45) Date of Patent: Sep. 27, 2016

(54) ELECTRET ELEMENT AND VIBRATION POWER GENERATING DEVICE USING THE SAME

(71) Applicants: Panasonic Corporation, Osaka (JP); IMEC vzw, Leuven (BE)

(72) Inventors: Hiroki Takeuchi, Osaka (JP); Vladimir Leonov, Leuven (BE)

(73) Assignees: PANASONIC CORPORATION, Osaka (JP); IMEC vzw, Leuven (BE)

( * ) Notice: Subject to any disclaimer, the term of this patent is extended or adjusted under 35 U.S.C. 154(b) by 414 days.

(21) Appl. No.: 14/074,096

(22) Filed: Nov. 7, 2013

(65) Prior Publication Data

US 2014/0145554 A1    May 29, 2014

(30) Foreign Application Priority Data

Nov. 26, 2012 (JP) ................................ 2012-257364

(51) Int. Cl.
  *H02N 1/00* (2006.01)
  *H02N 2/00* (2006.01)
  *H01L 41/00* (2013.01)
  *H02N 1/08* (2006.01)

(52) U.S. Cl.
  CPC ........................................ *H02N 1/08* (2013.01)

(58) Field of Classification Search
  CPC ................................ H02N 1/08; H02K 41/03
  USPC ................................. 310/309, 363, 364, 308
  See application file for complete search history.

(56) References Cited

U.S. PATENT DOCUMENTS

| | | | | |
|---|---|---|---|---|
| 5,267,076 | A | * 11/1993 | Broussoux | G02F 1/361 307/400 |
| 5,565,717 | A | * 10/1996 | Lewiner | H01G 7/02 264/436 |
| 5,920,454 | A | * 7/1999 | Nomura | H05K 1/162 361/313 |
| 2004/0007877 | A1 | 1/2004 | Boland et al. | |

(Continued)

FOREIGN PATENT DOCUMENTS

| | | | | |
|---|---|---|---|---|
| FR | 2968135 A1 | * 6/2012 | | H02N 1/08 |
| JP | 2005-529574 | 9/2005 | | |

(Continued)

OTHER PUBLICATIONS

H. Amjadi, "Charge Storage in Double Layers of Thermally Grown Silicon Dioxide and APCVD Silicon Nitride", IEEE Transactions on Dielectrics and Electrical Insulation, vol. 6, No. 6, Dec. 1999.

(Continued)

*Primary Examiner* — Jose Gonzalez Quinones
(74) *Attorney, Agent, or Firm* — Wenderoth, Lind & Ponack, L.L.P.

(57) ABSTRACT

In an electret element 100 including a substrate 101, an electrically-conductive electrode 103, and an electret layer 107 including a first dielectric layer 104 and a second dielectric layer 105, when electrical charge charged in the electret layer 107 is negative, a bottom Ec of conductive band of the second dielectric layer 105 is lower than a bottom Ec of the first dielectric layer 104, and when the electrical charge is positive, a top Ev of valence band of the second dielectric layer 105 is higher than a top Ev of the first dielectric layer 104; and a concave portion 106 is formed in a surface of the first dielectric layer 104; and the second dielectric layer 105 is formed to cover the entire of the bottom face 106a and at least a part of the side wall 106b of the concave portion.

21 Claims, 22 Drawing Sheets

(56) References Cited

U.S. PATENT DOCUMENTS

| | | |
|---|---|---|
| 2004/0016120 A1 | 1/2004 | Boland et al. |
| 2004/0077119 A1* | 4/2004 | Ikeda ................ B81C 1/00611 |
| | | 438/52 |
| 2004/0201946 A1* | 10/2004 | Iwamatsu ............... H01T 23/00 |
| | | 361/230 |
| 2008/0111444 A1 | 5/2008 | Mabuchi |
| 2010/0052469 A1 | 3/2010 | Naruse et al. |
| 2010/0109472 A1 | 5/2010 | Naruse et al. |
| 2011/0163615 A1* | 7/2011 | Leonov ................... H01G 7/02 |
| | | 307/400 |
| 2013/0241346 A1* | 9/2013 | Boisseau ................ H02N 1/08 |
| | | 310/300 |

FOREIGN PATENT DOCUMENTS

| | | |
|---|---|---|
| JP | 2008-141171 | 6/2008 |
| WO | 2008/053794 | 5/2008 |

OTHER PUBLICATIONS

Yoshihiko Sakane et al., "The development of a high-performance perfluorinated polymer electret and its application to micro power generation", Journal of Micromechanics and Microengineering 18 (2008) 104011.

* cited by examiner

Fig. 1
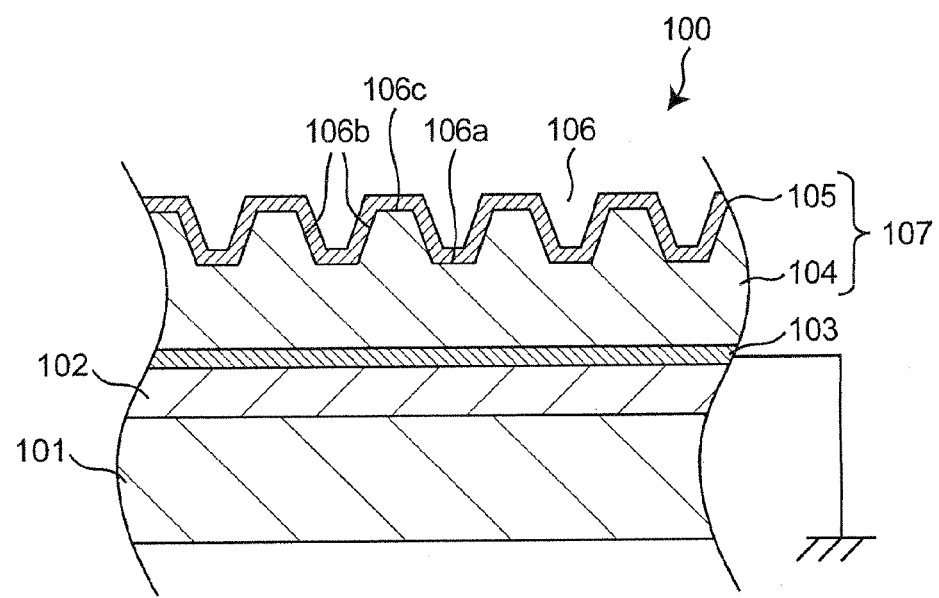
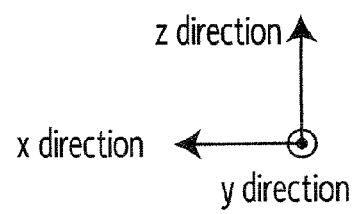

Fig. 2
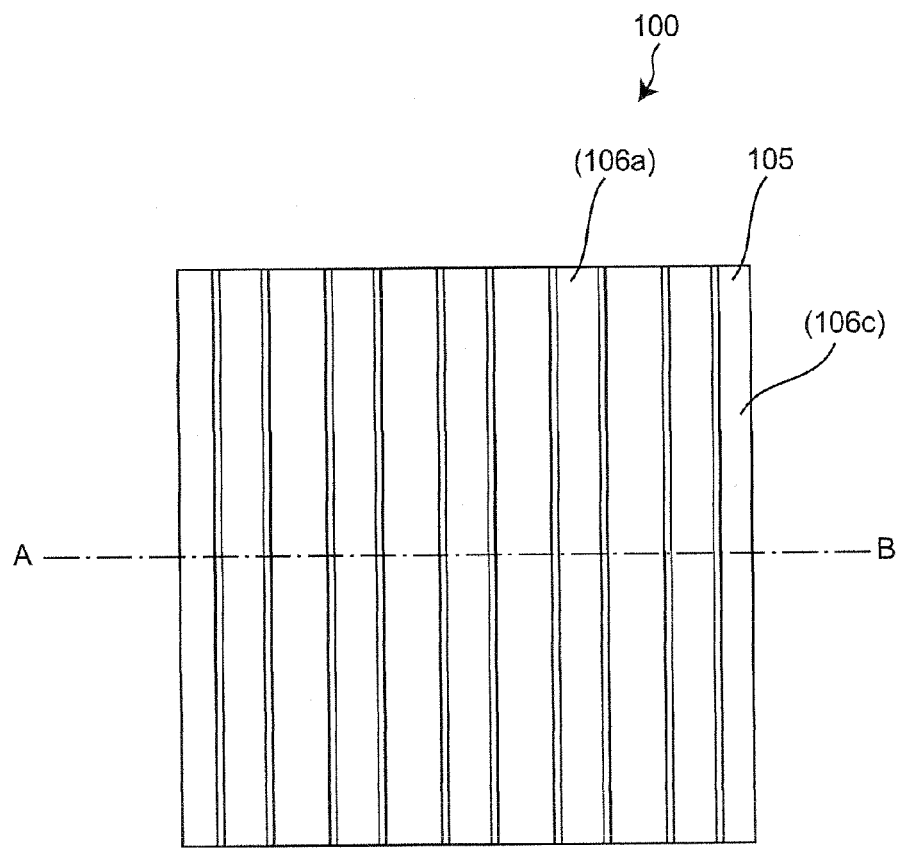
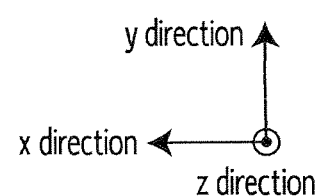

Fig. 5
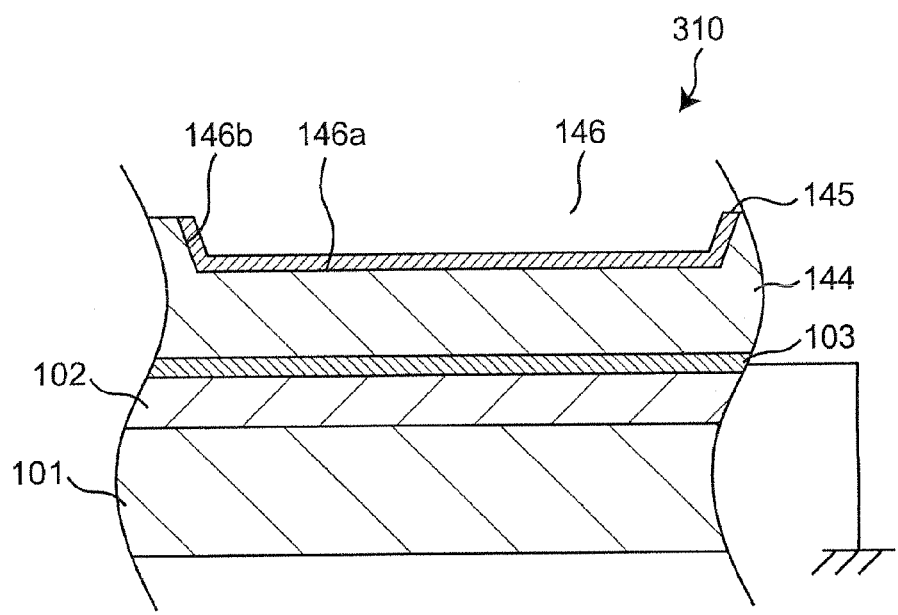
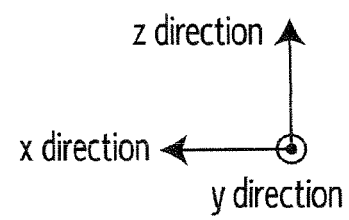

Fig. 7
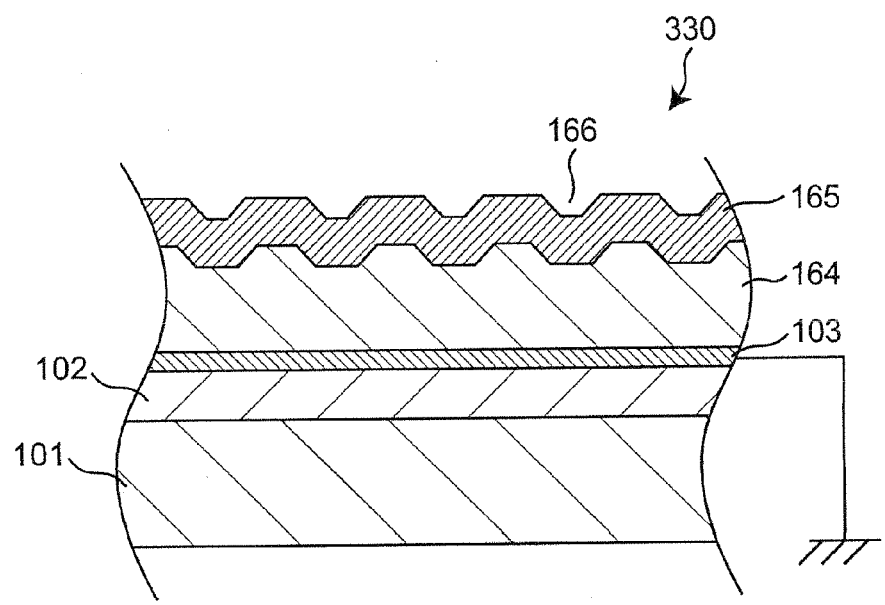
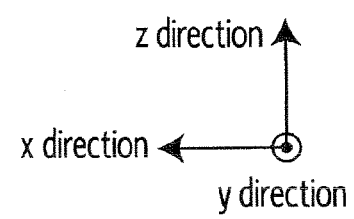

Fig. 8
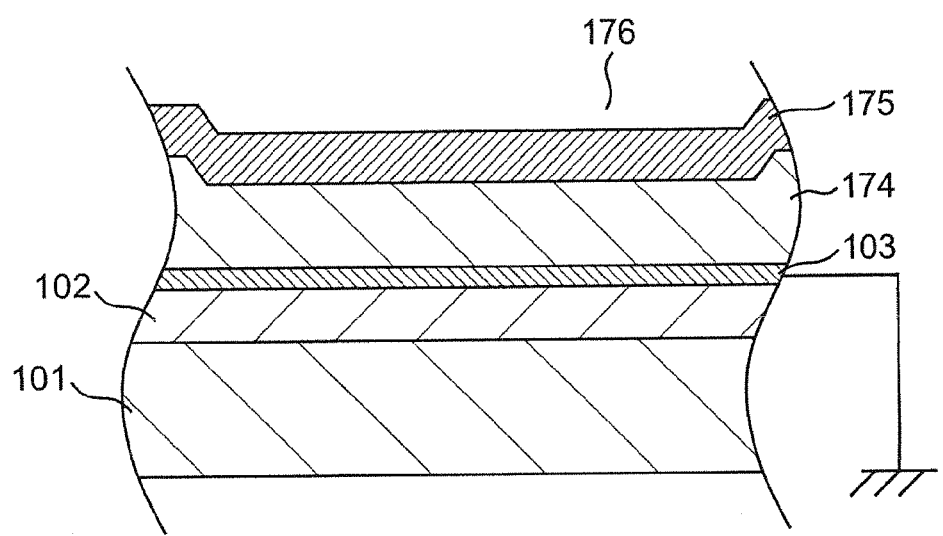
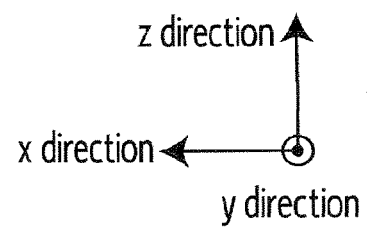

Fig. 11
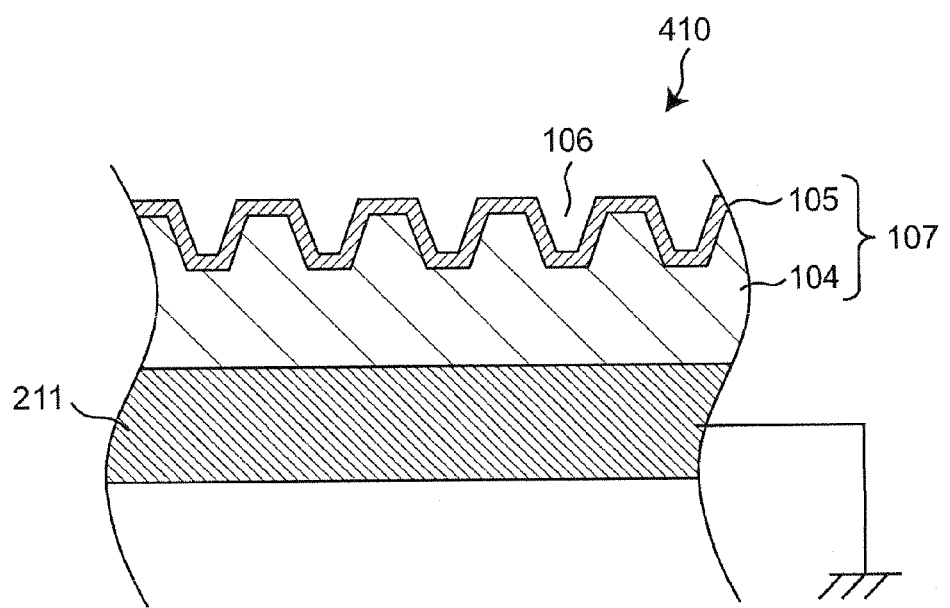
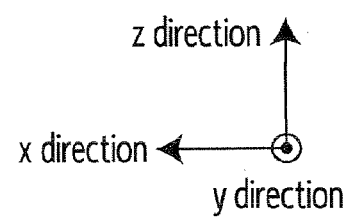

Fig. 16
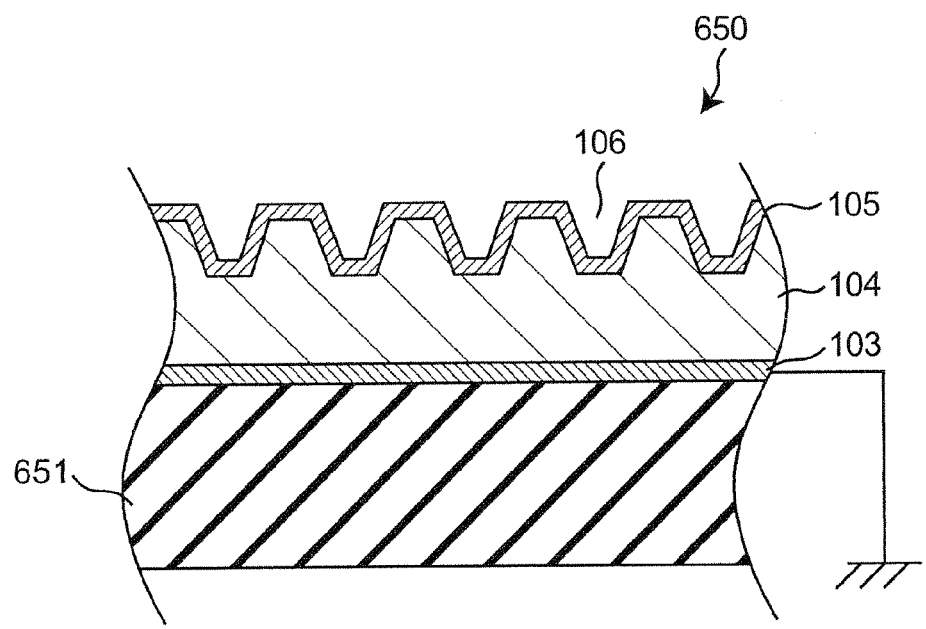
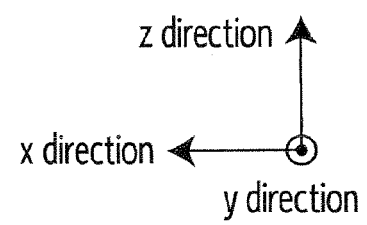

Fig. 17
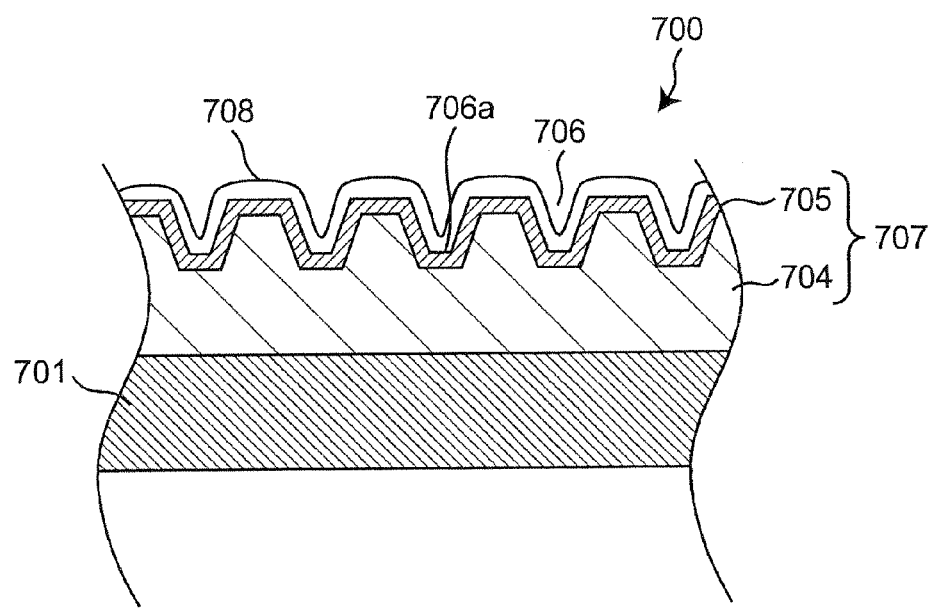
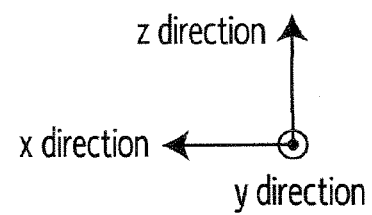

ELECTRET ELEMENT AND VIBRATION POWER GENERATING DEVICE USING THE SAME

CROSS REFERENCE TO RELATED APPLICATIONS

This application claims the priority of Japanese Patent Application No. 2012-257364 filed on Nov. 26, 2012, the disclosure of which, including the specification, drawings, and claims, are incorporated herein by reference in their entireties.

TECHNICAL FIELD

The present invention is related to an electret element and a vibration power generating device provided with the electret element.

BACKGROUND OF THE INVENTION

A vibration power generating device for converting vibration energy to electric energy has been proposed, which uses an electret which is a dielectric holding electrical charge semipermanently, and employs electrostatic induction occurred in a conductor which is approaching to the electret.

FIG. 19 shows a schematic cross-sectional view of a vibration power generating device described in JP-A 2005-529574. This vibration power generating device consists of a first substrate 11 provided with a plurality of collector electrodes 13, a second substrate 16 provided with a plurality of electret elements 15. The first substrate 11 and the second substrate 16 are arranged with a predetermined gap therebetween. The second substrate 16 is fixed. A spring 19 is connected to each of side surfaces of the first substrate 19 and to a fixing structure 17. The first substrate 11 is moved laterally by external vibration and returned to a fixed-position by spring force of the spring 19. This movement causes increase and decrease in overlapped area of the electret element 15 and the collector electrode 13 opposed to the element, changing the electrical charges induced in the collector electrode 13. An electrostatic induction-type vibration power generation device produces power by taking out the change in electrical charge as the electric energy.

H. Amjadi proposed an inorganic electret consisting of a laminate of a silicon nitride film and a silicon oxide film in "Charge Storage in Double Layers of Thermally Grown Silicon Dioxide and APCVD Silicon Nitride" (IEEE Transactions on Dielectrics and Electrical Insulation, Vol. 6, No. 6, December 1999). Sakane et al, proposed an organic electret of a perfluoride polymer in "The development of a high-performance perfluorinated polymer electret and its application to micro power generation" (JOURNAL OF MICROMECHANICS AND MICROENGINEERING 18 (2008) 104011). FIG. 20 shows the measurement results of TSC (Thermal Stimulated Current) of the inorganic electret proposed by H. Amjadi. FIG. 21 shows the TSC measurement results of the organic electret proposed by Sakane et al. The TSC measurement is technique of detecting electric current discharged when an object is heated to raise a temperature of the object. As the temperature at which the electric current is discharged from the object is higher, the thermal resistance of the object is higher. A TSC peak temperature for the inorganic electret consisting of a laminate of a silicon nitride film and a silicon oxide film is about 500° C. and the TSC peak temperature for CTL-A with aminosilane 3.0% as the organic electret is about 190° C. The electret consisting of the laminate of the silicon nitride film and the silicon oxide film has high reliability under high-temperature environment since the electret has high thermal resistance.

FIG. 22 is a cross-sectional view of an electret element 10 described in JP-A 2008-141171. The electret element 10 consists of a silicon substrate 1 and a silicon oxide film 2. Groove portions 1b and protruded portions 1c are formed in the silicon substrate 1 and the silicon oxide film 2 is formed to cover the inner surfaces of the groove portions 1b and the surfaces of the protruded portions 1c between the groove portions 1b. In the case where the silicon oxide film 2 is formed by thermal oxidation method, the silicon oxide film 2 can be formed not only in a direction perpendicular to a principal surface 1a of the silicon substrate 1, but also in a direction parallel to the principal surface 1a of the silicon substrate 1 from the inner side surface of the groove portion 1b. Therefore, the formation of the silicon oxide film 2 of which surface area (volume) per unit planar volume is increased, can increase an amount of electrical charge which can be injected to the electret element 10, thereby increasing surface potential. The use of such an electret element can increase power output of the vibration power generation device.

FIG. 23 is a cross-sectional view of a fixed electrode portion 50 including an electret element, which is described in WO2008/053794. An electret film 32 having convex portions 32a is formed on a surface of an electret film 31 and a pectinated conductor layer 33 is formed on a surface of the electret film 32 (the convex portions 32a). A film 34 for preventing electrical charge from flowing out is formed on the side surface and the upper surface of the conductor layer 33. Since the conductor layer 33 functions to block electric field formed by the electrical charge accumulated in the electret film 32, the surface potential of a region where the conductor layer 33 is formed is small and the surface potential of the region where the conductor layer 33 is not formed and the electret film 32 is exposed is large. In this manner, the high and low surface potentials are formed like a comb in the fixed electrode portion 50 including electret element. Therefore, when the overlapped area of the fixed electrode portion 50 and the collector electrode opposed thereto is changed during the operation, an amount of electrical charge induced in the collector electrode is changed and the change is taken out as the electric current.

SUMMARY OF THE INVENTION

The object of the present invention to provide an electret element wherein electrical charge-holding stability of an electret including a laminate of two dielectrics is improved, and the electrical charge is particularly prevented from flowing out to the environment around a substrate.

An embodiment of the present invention is an electret element including a substrate, an electrically-conductive electrode, and an electret layer including a first dielectric layer and a second dielectric layer, wherein:

the electret layer is capable of holding electrical charge, the electrically-conductive electrode is formed on a surface of the substrate, the first dielectric layer is formed on a surface of the electrically-conductive electrode and has, in a surface opposite to an electrically-conductive electrode-side surface, at least one concave portion having a bottom face, a side wall and a top face, the second dielectric layer covers the entire of the bottom face and at least a part of the side wall, and a bottom Ec of conductive band of the second dielectric layer is lower than a bottom Ec of conductive band of the first dielectric layer, or a top Ev of valence band of the second dielectric layer is higher than a top Ev of valence band of the first dielectric layer.

The electret element according to one embodiment of the present invention can improve the electrical charge-holding stability of the electret which is a laminate of two dielectrics, and can particularly prevent the electrical charge from flowing out to the environment of the substrate. Therefore, the use of the electret element according to one embodiment of the present invention can provide a vibration power generating device which is excellent in stability of power output.

BRIEF DESCRIPTION OF THE DRAWINGS

FIG. 1 is a cross-sectional view of an electret element 100 according to an embodiment.

FIG. 2 is a plan view of the electret element 100 according to the embodiment.

FIG. 5 is a cross-sectional view of a second variation of the electret element according to the embodiment.

FIG. 7 is a cross-sectional view of a fourth variation of the electret element according to the embodiment.

FIG. 8 is a cross-sectional view of a fifth variation of the electret element according to the embodiment.

FIG. 11 is a cross-sectional view of an eighth variation of the electret element according to the embodiment.

FIG. 16 is a cross-sectional view of a thirteenth variation of the electret element according to the embodiment.

FIG. 17 is a cross-sectional view of an example of the electret element.

DETAILED DESCRIPTION OF THE PREFERRED EMBODIMENTS

Figure 3:
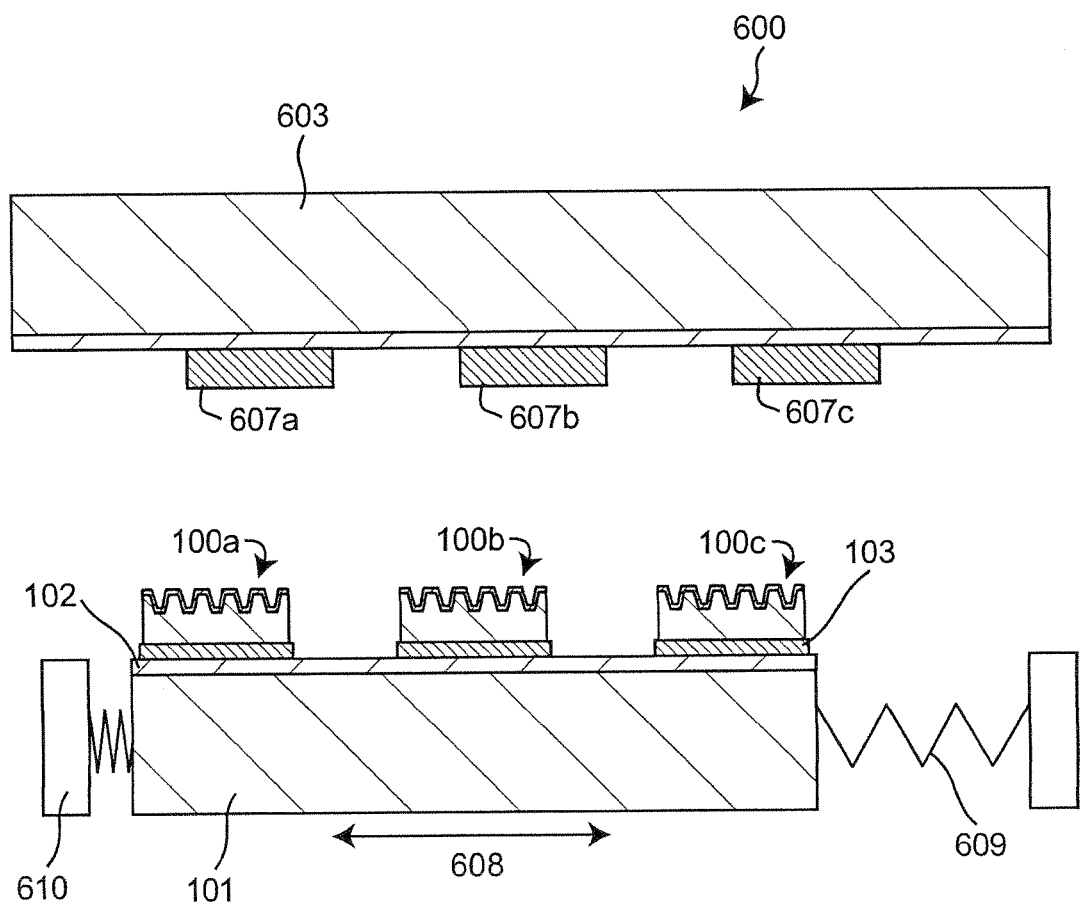
FIG. 3 is a cross-sectional view of a vibration power generating device using the electret element 100 according to the embodiment.

Circumstances where an Embodiment of the Present Invention was Obtained

As described above, the electret including a laminate of a silicon nitride film and a silicon oxide film has high thermal resistance and is advantageous to the use under environment of high temperature. However, insulation characteristics between the silicon nitride film and the silicon oxide film are relatively low since there congested defects due to the lattice mismatch and the difference in stress between the two films. For this reason, the electrical charge tends to move along the interface and the moved electrical charge tends to finally flow out from the interface exposed at the end face and so on.

Further, only the silicon oxide film 2 is formed as the electret film in the electret element 40 shown in JP-A 2008-141171. If a silicon nitride film is formed on a surface of this silicon oxide film 2, it is considered that a laminate structure described in "Charge Storage in Double Layers of Thermally Grown Silicon Dioxide and APCVD Silicon Nitride" (H. Amjadi, IEEE Transactions on Dielectrics and Electrical Insulation, Vol. 6, No. 6, December 1999) would be obtained and the thermal resistance would be improved. However, in such a laminate structure, the electrical charge tends to move at the interface between the silicon nitride film and the silicon oxide film, whereby the electrical charge tends to flow out from the exposed interface.

Further, it is considered that, if the film 34 for preventing electrical charge from flowing out is the silicon nitride film in the fixed electrode portion 50 including the electret element described in WO2008/053794, the thermal resistance would be improved. However, the electrical charge tends to move at the interface between the silicon nitride film and the silicon oxide film and thereby tends to flow out from the exposed interface. Further, the electrical charge tends to flow out to the conductor layer 33 since the conductor layer 33 pulls the electrical charge.

As described above, the electret including the laminate of the silicon nitride film and the silicon oxide film shows favorable thermal resistance since the electrical charge held by the electret are difficult to be discharged, but the long-term electrical charge-holding stability is not satisfactory. For this reason, there is a problem that the power output gradually decreases with time in a vibration power generating device provided with an electret element including the electret of this laminate.

The present inventors studied a construction for preventing the electrical charge from flowing out due to the movement of the charge at the interface, and improving the electrical charge-holding stability in the electret including the laminate of the silicon nitride film and the silicon oxide film. As a result, the present inventors found that the electrical charge-holding stability is improved by forming concave portion in the silicon oxide film and laying the silicon nitride film on the silicon oxide film such that the silicon nitride film covers the entire of bottom face and at least a part of side wall of the concave portion.

MODES OF THE INVENTION

A first mode of the present invention is an electret element including a substrate, an electrically-conductive electrode, and an electret layer including a first dielectric layer and a second dielectric layer, wherein:

the electret layer is capable of holding electrical charge, the electrically-conductive electrode is formed on a surface of the substrate, the first dielectric layer is formed on a surface of the electrically-conductive electrode and has, in a surface opposite to an electrically-conductive electrode-side surface, at least one concave portion having a bottom face, a side wall and a top face, the second dielectric layer covers the entire of the bottom face and at least a part of the side wall, and a bottom Ec of conductive band of the second dielectric layer is lower than a bottom Ec of conductive band of the first dielectric layer, or a top Ev of valence band of the second dielectric layer is higher than a top Ev of valence band of the first dielectric layer.

Here, the "electret" means a dielectric which is capable of holding electrical charge semipermanently and the "electret layer" means a layer of electret. The "electret element" means an element including a substrate which supports the electret (or the electret layer) and an electrode and so on. The electret (or the electret layer) may consist of a plurality of dielectrics and the electrical charge may be held by a part or all of the plural dielectrics.

In the first mode, the electrical charge held at the bonded interface between the first dielectric layer and the second dielectric layer is pulled toward the electrically-conductive electrode by electrostatic force and therefore cannot move in a direction away from the electrically-conductive electrode ("z" direction in FIG. 1). More specifically, even if the electrical charge tries to move along the side wall of the concave portion at the interface between the first dielectric layer and the second dielectric layer, it is pulled toward the electrically-conductive electrode and difficult move in a direction away from the electrically-conductive electrode. As a result, the electrical charge is stably held in a bottom region of the concave portion.

In the first mode, when the electrical charge held by the electret layer is negative charge, a bottom Ec of conductive band of the second dielectric layer is lower than a bottom Ec of conductive band of the first dielectric layer. When the electrical charge held by the electret layer is positive charge, a top By of valence band of the second dielectric layer is higher than a top Ev of valence band of the first dielectric layer. By satisfying this relationship, the electret element with high thermal resistance can be obtained wherein the electrical charge is less likely to be discharged from the electret layer even under high temperature.

A second mode is the electret element according to the first mode, wherein the electret layer further includes at least one dielectric layer and the at least one dielectric layer is formed between the electrically-conductive electrode and the first dielectric layer. In this case, an amount of the electrical charge held in the electret element is increased, whereby a surface potential can be increased.

A third mode is the electret element according to the first or the second mode, wherein the electrical charge is held in the electret layer and the electrically-conductive electrode is connected to:

a potential which is of the same polarity as that of the electrical charge and has an absolute value being smaller than the absolute value of a surface potential of the electret layer, or a potential which is of a polarity different from that of the electrical charge.

A fourth mode is the electret element according to the first or the second mode, wherein the electrically-conductive electrode is connected to an earth potential.

When the electrically-conductive electrode is connected to: the earth potential; or the potential which is of the same polarity as that of the electrical charge and has an absolute value being smaller than the absolute value of a surface potential of the electret layer; or the potential which is of a polarity different from that of the electrical charge, the electrical charge is more surely pulled toward the electrically-conductive electrode by electrostatic force. As a result, the electrical charge is more difficult to move in a direction away from the electrically-conductive electrode ("z" direction in FIG. 1), and held more stably in the bottom region of the concave portion.

A fifth mode is the electret element according to any one of the first to the fourth modes, wherein the first dielectric layer is a silicon oxide film and the second dielectric layer is a film selected from the group consisting of a silicon nitride film, an aluminum oxide film, a hafnium oxide film and a titanium oxide film.

A sixth mode is the electret element according to any one of the first to the fifth modes, wherein the substrate is an electrically-conductive substrate and a third dielectric layer is formed between the electrically-conductive substrate and the electrically-conductive electrode.

A seventh mode is the electret element according to the sixth mode, wherein the electrically-conductive substrate is a silicon substrate, the third dielectric layer is a silicon oxide film and the electrically-conductive electrode consists of polycrystalline silicon.

An eighth mode is the electret element according to any one of the first to the fifth modes, wherein the substrate is an insulative substrate.

A ninth mode is the electret element according the eighth mode, wherein the insulative substrate is a glass substrate or a sapphire substrate, and the electrically-conductive electrode consists of a material selected from the group consisting of polycrystalline silicon, aluminum and copper.

A tenth mode is the electret element according to the first or the second element wherein an electrically-conductive substrate is substituted for the substrate and the electrically-conductive electrode, and the first dielectric layer is formed on a surface of the electrically-conductive substrate. In this case, it is not necessary to form the electrically-conductive electrode, and thereby the number of times of membrane formation.

An eleventh mode is the electret element according to the tenth electret element, wherein the electrical charge is held in the electret layer and the electrically-conductive substrate is connected to:

a potential which is of the same polarity as that of the electrical charge and has an absolute value being smaller than the absolute value of a surface potential of the electret layer, or a potential which is of a polarity different from that of the electrical charge.

A twelfth mode is the electret element according to the tenth mode wherein the electrically-conductive substrate is connected to an earth potential. The effects of connecting the electrically-conductive substrate to any one of the above-mentioned potentials in the eleventh and the twelfth modes are the same as those of the third and the fourth modes.

A thirteenth mode is the electret element according to any one of the first to the twelfth modes, wherein a depth from the bottom face to the top face of the concave portion is larger than a thickness of the second dielectric layer. In this case, it is possible to prevent the outflow of not only the electrical charge which moves at the interface between the first dielectric layer and the second dielectric layer, but also the electrical charge which moves inside the second dielectric layer.

A fourteenth mode is the electret element according to any one of the first to the thirteenth modes, wherein a plurality of the concave portions are formed and an interval between two adjacent concave portions is larger than a thickness of the first dielectric layer.

A fifteenth mode is the electret element according to any one of the first to the fourteenth modes further including a moisture-proof layer, wherein the moisture-proof layer covers:

a surface of the second dielectric layer, or the surface of the second dielectric layer and a region of the surface of the first dielectric layer, which region is not covered with the second dielectric layer.

A sixteenth mode is a vibration power generating device which is provided with the electret element according to any one of the first to the fifteenth modes. As described above, since the electrical charge-holding stability can be improved in the electret element according to the first mode, the vibration power generating device utilizing the electret element of the first mode or another electret element which utilizes the first mode, can improve the power output.

Embodiments of the present invention will be described below with reference to the drawings. In the following description, redundant description for substantially the same constitution may be omitted.

Embodiments

FIG. 1 is a cross-sectional view of an electret element 100 of an embodiment. FIG. 2 is a plan view of the electret element 100 and the cross-sectional view shown in FIG. 1 corresponds to the cross section taken along A-B in FIG. 2. The electret element 100 consists of a substrate 101, a third dielectric layer 102 formed on a principal surface of the substrate 101, an electrically-conductive electrode 103 formed on a surface of the third dielectric layer 102, a first dielectric layer 104 formed on a surface of the electrically-conductive electrode 103 and a second dielectric layer 105.

A laminate of the first dielectric layer 104 and the second dielectric layer 105 constitutes an electret layer 107 and electrical charge is injected in the electret layer 107. In this embodiment, a plurality of concave portions 106 are formed in the first dielectric layer 104 and the second dielectric layer 105 is formed such that it covers the concave portions 106, that is, it covers the entire of the bottom face 106a, the side wall 106b and the top face 106c.

The concave portion 106 has the bottom face 106a, the side wall 106b, and the top face 106c. In the illustrated embodiment, the bottom face 106a and the top face 106c of the concave portion are parallel to a principal surface of the substrate 101. For example, the bottom face 106a and the top face 106c may be curved partially. The side wall 106b may be vertical to the principal surface of the substrate 101 or may be inclined as shown in FIG. 1. When the side wall 106b is inclined, it is easy to form the second dielectric layer 105 uniformly. Alternatively, the side wall 106b may be curved. For example, the side wall 106 may be a quadratic curve represented by $f(x)=x^2$ in the cross section shown in FIG. 1.

A depth from the bottom face 106a to the top face 106c of the concave portion 106 is larger than a thickness of the second dielectric layer 105. When the bottom face 106a of the concave portion is curved and the level (height) of the bottom face is not constant, the deepest point (a point which is closest to the substrate 101) is a basis for determining the depth. When the top face 106c is curved and the level (height) of the top face is not constant, the highest point (a point which is furthest from the substrate 101) is the basis for determining the depth. The effects obtained when the depth of the concave portion 106 and the thickness of the second dielectric layer 105 satisfy this relationship are as described in connection with the eleventh mode.

As shown in FIG. 2, the concave portions 106 are of a rectangular shape when viewed in "z" direction and are juxtaposed parallel to each other. Since FIG. 2 is a plan view of a surface of the second dielectric layer 105 when viewed from the upper side, the part corresponding to each part of the concave portion 106 is denoted by a numeral with parenthesis. When the concave portions are formed in this manner, the electrical charge is more stably held. Further, the concave portions of this shape and arrangement make it possible to use the same reticle in production process employing semiconductor process even when a pattern of the electret layer 107 (the pattern of electret element in the case of forming a plurality of electret elements 100a to 100c as shown in FIG. 3) is changed.

The injection of the electrical charge to the electret layer 107 is conducted by, for example, corona discharging. The electrical charge is injected into one or both of the first dielectric layer 104 and the second dielectric layer 105 in the electret layer 107. The polarity of the injected electrical charge may be positive or negative.

In this embodiment, the electrically-conductive electrode 103 is connected to an earth potential. Alternatively, the electrically-conductive electrode 103 may be connected to a potential which is of the same polarity as that of the electrical charge held in the electret layer 107 and has an absolute value being smaller than the absolute value of a surface potential of the electret layer 107, or a potential which is of a polarity different from that of the electrical charge held in the electret layer 107. For example, when the negative electrical charge is held in the electret layer 107 and the surface potential of the electret layer 107 is −250 V, the electrically-conductive electrode 103 may be connected to a potential which is lower than the surface potential, for example, a potential of −240 V to +750 V. Alternatively, when the positive electrical charge is held in the electret layer 107 and the surface potential of the electret layer 107 is +250 V, the electrically-conductive electrode 103 may be connected to a potential of −750 V to +240 V. Further, the surface potential of the electret layer 107 and the potential of the electrically-conductive electrode 103 may be selected such that the difference between these potentials is not over a dielectric strength voltage of the electret layer. Such selection suppresses the outflow of the electrical charge due to insulation breakdown, or loss of the electret characteristics due to the formation of a leak path.

Further, a distance between two adjacent concave portions 106 (which corresponds to a length of a line connecting centers of the bottom faces 106a in FIG. 1) is preferably larger than a thickness of the first dielectric layer 104. The thickness of the first dielectric layer 104 is a thickness determined at the thinnest point (the thickness at the bottom face). This prevents the electrical charge from flowing out due to linear movement of the electrical charge between the bottom faces 106a because of hopping conduction or the like when the difference in potential is observed between the bottom faces 106a of the two adjacent concave portions 106 within the amount of electrical charge which can be held in the first dielectric layer 104 (a product of a dielectric voltage (MV/cm) of the first dielectric layer 104 and the thickness of the first dielectric layer 104).

The substrate 101 is a monocrystalline silicon substrate which is doped an impurity and is an electrically-conductive substrate having conductivity. The third dielectric layer 102 is a silicon oxide film having a thickness of 1 μm, which is formed by oxidizing the substrate 101 by a thermal oxidation method. The electrically-conductive electrode 103 is a polycrystalline silicon film having a thickness of 300 nm, which is doped with an impurity. The first dielectric layer 104 is a silicon oxide film having a thickness of 1000 nm, which is formed by a LPCVD (Low pressure chemical vapor deposition) method and the second dielectric layer 105 is a silicon nitride film having a thickness of 150 nm, which is formed by the LPCVD method. The concave portion 106 in the first dielectric layer 104 is formed by dry etching. In the concave portion 106, a width of the bottom face 106a is 5 μm and the width of the top face 106c is 5 μm. The interval between adjacent concave portions 106 (a distance between centers of adjacent bottom faces 106a, which is referred to as "pitch") is 10 μm and the depth is 350 nm. Further, the side wall 106b is inclined in the concave portion 106.

FIG. 3 shows a cross-sectional view of a vibration power generating device 600 provided with the electret element 100 of the present embodiment. The vibration power generating device 600 includes electret elements 100a to 100c (wherein the substrate 101 constituting the electret elements 100a to 100c is a common single substrate) which are formed by patterning the electret layer 107 and the electrically-conductive electrode 103, a substrate 603 with collector electrodes 607 which is arranged opposed to the electret elements with a predetermined gap. Both ends of the substrate 101 are connected to fixing structures 610 via elastic structures 609. The elastic structure 609 may be a spring or may be formed of a material which pushes back the substrate 101 due to repulsion (for example, rubber).

When vibration 608 is applied from the outside, the elastic structure 609 stretches and contracts, and thereby the substrate 101 relatively moves to the substrate 603. AT this time, the overlapped areas between the electret elements 100a to 100c and the collector electrodes 607a to 607c are changed, resulting in increase and decrease in an amount of electrical charge induced in the collector electrodes 607a to 607c. The power generation is conducted by taking out this change in electrical charges as electrical energy. The vibration power generating device 600 may be used in, for example, a wireless communication module which consumes small power, and other electronic devices.

The electret element 100 according to the present embodiment can give the effect of improving the electrical charge-holding stability of the electret. This effect will be described below in detail.

The electrical charge injected and held in the electret element 100 diffuses and flows out with time by electrostatic repulsion force acted on the held electrical charges, from the inside of the electret element 100 where the charge density is high to the outside of the electret element 100 where the charge density is low. At this time, the electrical charge held inside the electret element 100 flows out passing through the region where the insulation properties are low, of the inside of the electret element 100. The bonded interface between the first dielectric layer 104 and the second dielectric layer 105 which constitute the electret element 100, is a bonded face of different materials of the first dielectric layer 104 and the second dielectric layer 105. Since the bonded face is a region where more lattice defects exist, the bonded face is less insulative. Therefore, the electrical charge held inside the electret element 100 tends to move along the bonded interface between the first dielectric layer 104 and the second dielectric layer 105 and flow out.

As shown in FIG. 1, the bonded interface between the first dielectric layer 104 and the second dielectric layer 105 extends in the direction away from the electrically-conductive electrode 103 ("z" direction in FIG. 1) at the side wall 106b of the concave portion. Therefore, when the electrical charge held inside the electret element 100 moves along the bonded interface between the first dielectric layer 104 and the second dielectric layer 105, the electrical charge moves in the direction away from the electrically-conductive electrode 103 ("z" direction in FIG. 1). On the other hand, the electrical charge held inside the electret element 100 is drawn to the electrically-conductive electrode 103 by electrostatic force since the electrically-conductive electrode 103 is connected to an earth potential in this embodiment. Thus, even if the electrical charge tries to move in the direction away from the electrically-conductive electrode 103 ("z" direction in FIG. 1) along the bonded interface between the first dielectric 104 and the second dielectric 105, the electrical charge cannot move from the bottom region of the concave portion 106 because the electrostatic force pulling the charge toward the electrically-conductive electrode 103 acts on the charge. This prevents the outflow of the electrical charge and the electrical charge is held stably in the bottom face 106a of the concave portion 106. This is applicable to the case where the electrically conductive electrode 103 is connected to: a potential which is of the same polarity as that of the electrical charge held by the electret layer 107 and has an absolute value being smaller than the absolute value of a surface potential of the electret layer 107; or a potential which is of a polarity different from that of the electrical charge held in the electret layer 107.

Figure 4:
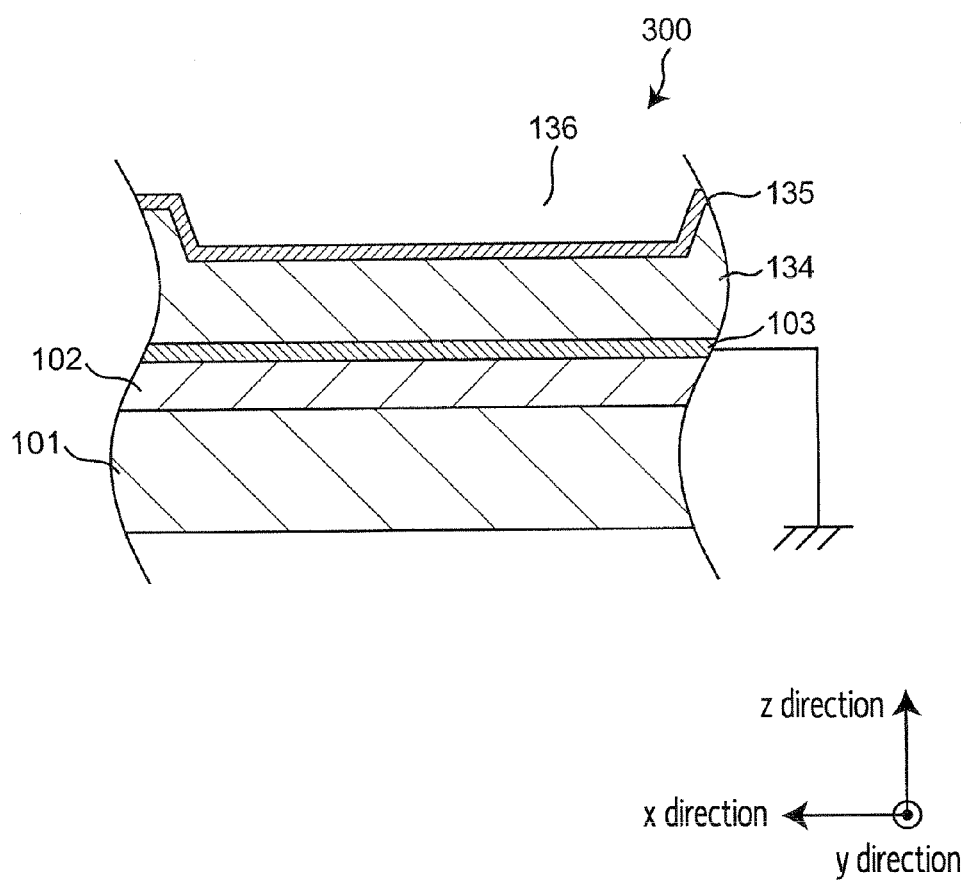
FIG. 4 is a cross-sectional view of a first variation of the electret element according to the embodiment.

In the present embodiment, a configuration having a plurality of concave portions 106 is shown. In a first variation, a first dielectric layer 134 of one electret element 300 may have only one concave portion 136, as shown in FIG. 4. In this case, it is easy for a second dielectric layer 135 to cover a bottom face and a side wall of the concave portion 136 since the size of the concave portion 136 can be increased.

Figure 6:
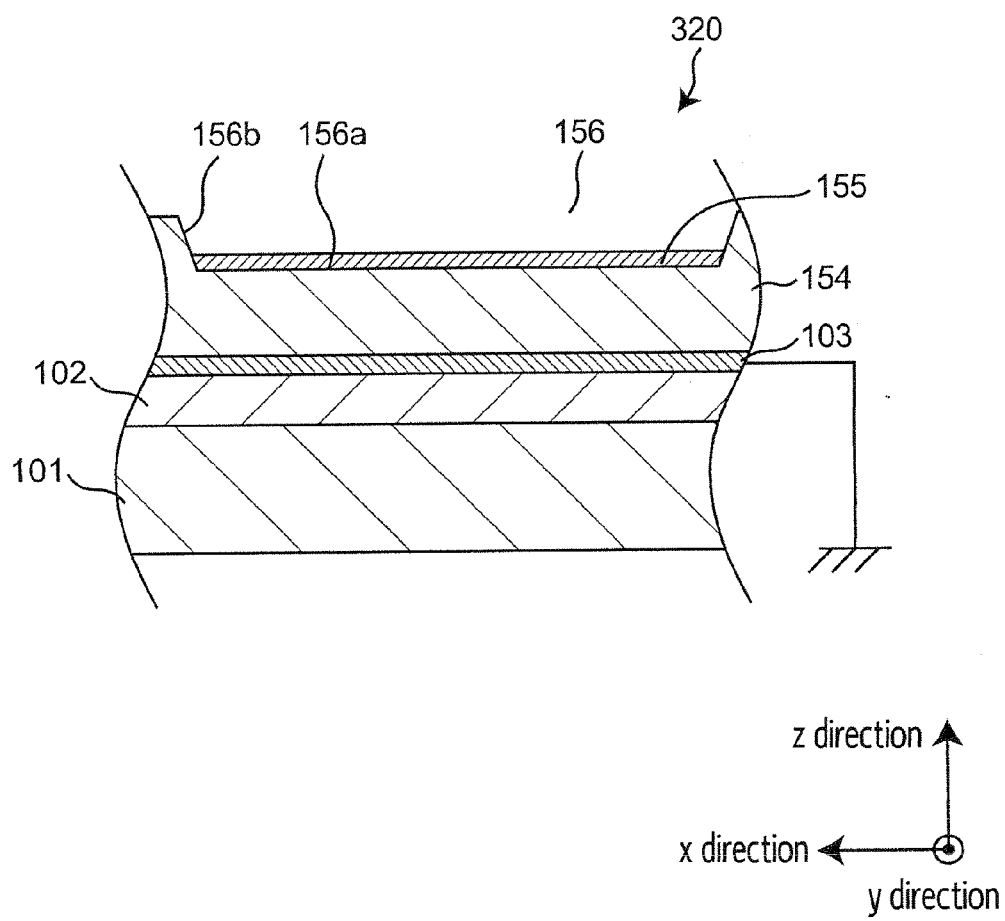
FIG. 6 is a cross-sectional view of a third variation of the electret element according to the embodiment.

In an electret element 310 of a second variation, a second dielectric layer 145 may be formed such that it covers only a bottom face 146a and a side wall 146b of a concave portion 146 in a first dielectric layer 144 as shown in FIG. 5. Alternatively, in an electret element 320 of a third variation, a second dielectric layer 155 may cover only a bottom face 156a and a part of side wall 156b of a concave portion 156 in a first dielectric layer 155 as shown in FIG. 6. Also in these variations, the electrical charges which move the bonded interfaces between the first dielectric layers 144 and 154 and the second dielectric layer 145 and 155 cannot flow out unless they move in the "z" direction. However, in these variations, the movement of the electrical charges in the "z" direction is suppressed by the electrostatic force, and therefore the electrical charges can be stayed within the concave portions 146 and 156 and the electrical charge-holding stability is improved.

In an electret element 330 of a fourth variation of the present embodiment, a thickness of a second dielectric layer 165 may be larger than a distance from a bottom face to a top face of a concave portion 166 in a first dielectric layer 164, as shown in FIG. 7. Further, in a fifth variation (which is a variation of the fourth variation), an electret element 340 may have only one concave portion 176 as shown in FIG. 8. In these variations, the thicknesses of the second dielectric layers 165 and 175 are larger than the depths of the concave portions 166 and 167 in the first dielectric layers 164 and 174 so as to bury the concave portions 166 and 176 with the second dielectric layers 165 and 175, whereby the second dielectric layers 165 and 175 do not discontinue, for example at the side walls of the concave portions and the bottom faces and the side walls of the concave portions are continuously and satisfactorily covered with the second dielectric layers 165 and 175.

Figure 9:
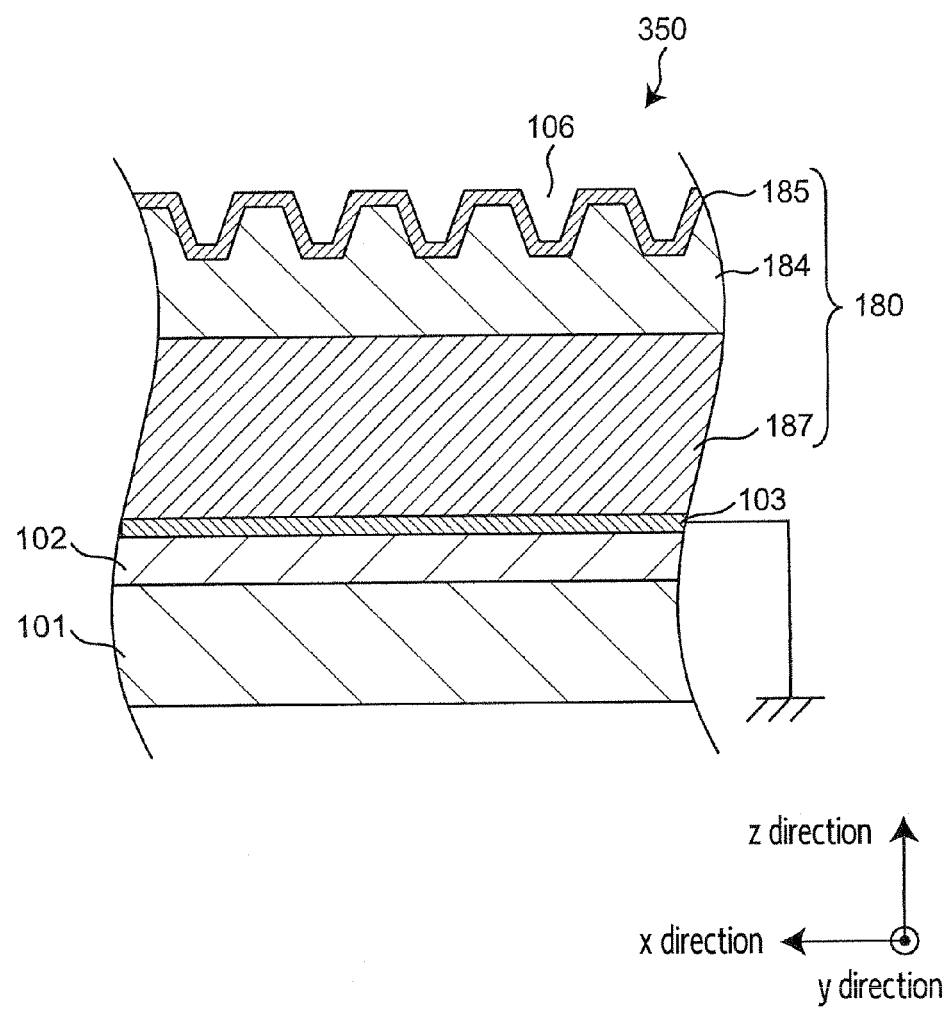
FIG. 9 is a cross-sectional view of a sixth variation of the electret element according to the embodiment.

In an electret element 350 of a sixth variation of the present embodiment, one or more dielectric layers 187 may be formed between an electrically-conductive electrode 183 and a first dielectric layer 184 and thereby an electret layer 180 may consists of three dielectric layers 185, 184 and 187 as shown in FIG. 9. In this case, an amount of electrical charge which is capable of being held in the electret layer 180 can be increased. For example, the dielectric breakdown occurs when electric field larger than about 5 MV/cm to about 7 MV/cm is applied in the electret of a silicon oxide film. Therefore, when the thickness of the silicon oxide film as the first dielectric layer 184 is 1 μm, the limit of surface potential is 500 V.

On the other hand, when another dielectric layer 187 is formed between the electrically-conductive electrode 183 and the first dielectric layer 184, the limit of surface potential can be increased by a product of the dielectric voltage (MV/cm) and the thickness of the another dielectric layer 187. As a result, the surface potential of the electret element 350 can be increased and the electrostatic induction characteristics of the electronic device using the electret element 350 can be increased. As a result, when the electret element 350 is applied to, for example, a vibration power generating device, the output power can be increased.

Figure 10:
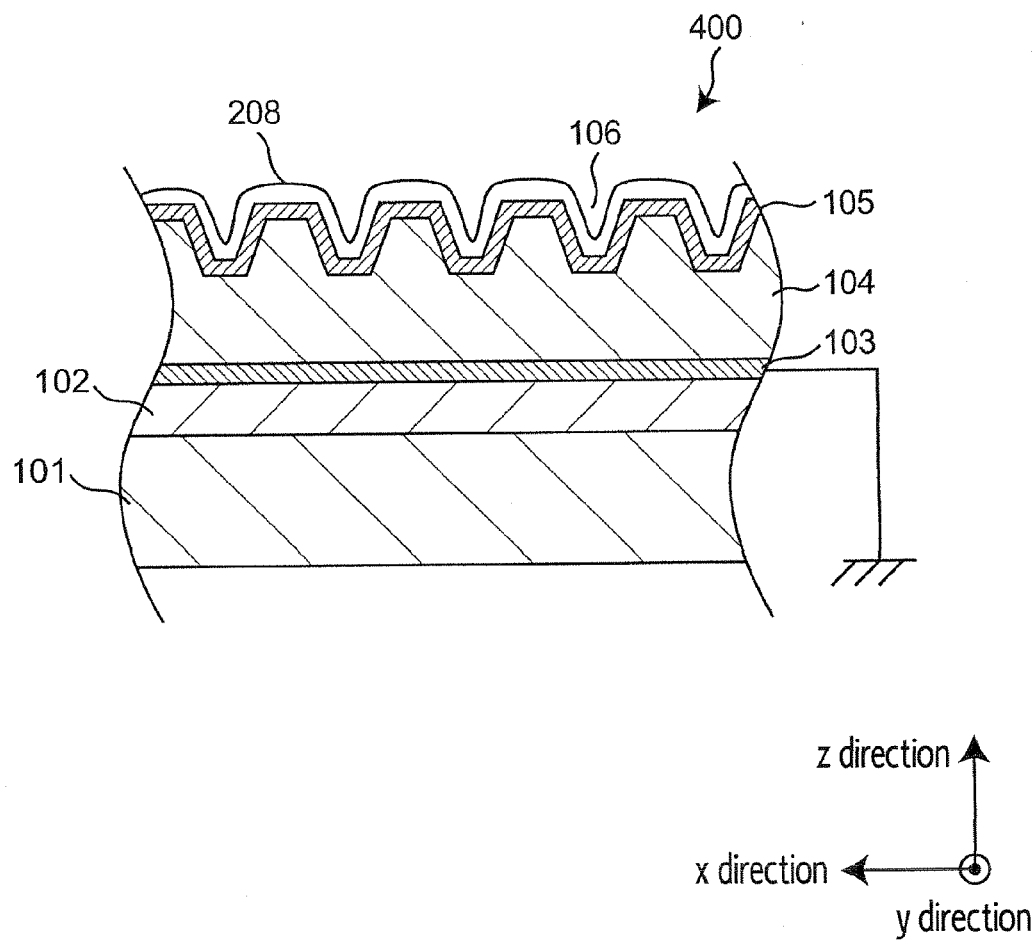
FIG. 10 is a cross-sectional view of seventh variation of the electret element according to the embodiment.

In an electret element 400 of a seventh variation of the present embodiment, a moisture-proof layer 208 may be formed on a surface of the second dielectric layer 105 as shown in FIG. 10. The moisture proof layer 208 prevents the electrical charge in the electret layer 107 from being deprived by the moisture in the air, and thereby the electrical charge-holding stability can be further improved. The moisture-proof layer may be HMDS (hexa methyl disilane) wherein a hydrophobic group prevents water adsorption, BCB (benzocyclobutene) or a high gas-barrier inorganic material (for example, a silicon oxide film, a silicon nitride film or an aluminum oxide film). The moisture-proof layer is formed such that, when a portion of surface of the first dielectric layers 144 and 154 is not covered with the second dielectric layer (145 and 155) and is exposed as in the electret elements 310 and 320 as shown in FIGS. 5 and 6, the exposed region is also covered with the moisture-proof layer.

In an electret element 410 of an eighth variation of the present embodiment, an electrically-conductive substrate 211 may be used instead of the electrically-conductive electrode and a substrate and the substrate 211 may be connected to an earth potential as shown in FIG. 11. In the case of using the electrically-conductive substrate, the electrical charge-holding stability can be improved. The electrically-conductive substrate 211 may be connected to a potential which is of the same polarity as that of the electrical charge held in the electret layer 107 and has an absolute value being smaller than the absolute value of a surface potential of the electret layer 107, or a potential which is of a polarity different from that of the electrical charge held in the electret layer 107. Since this construction does not require the third dielectric layer and the electrically-conductive electrode, the construction of electret element is simplified and has advantage in costs.

Figure 12:
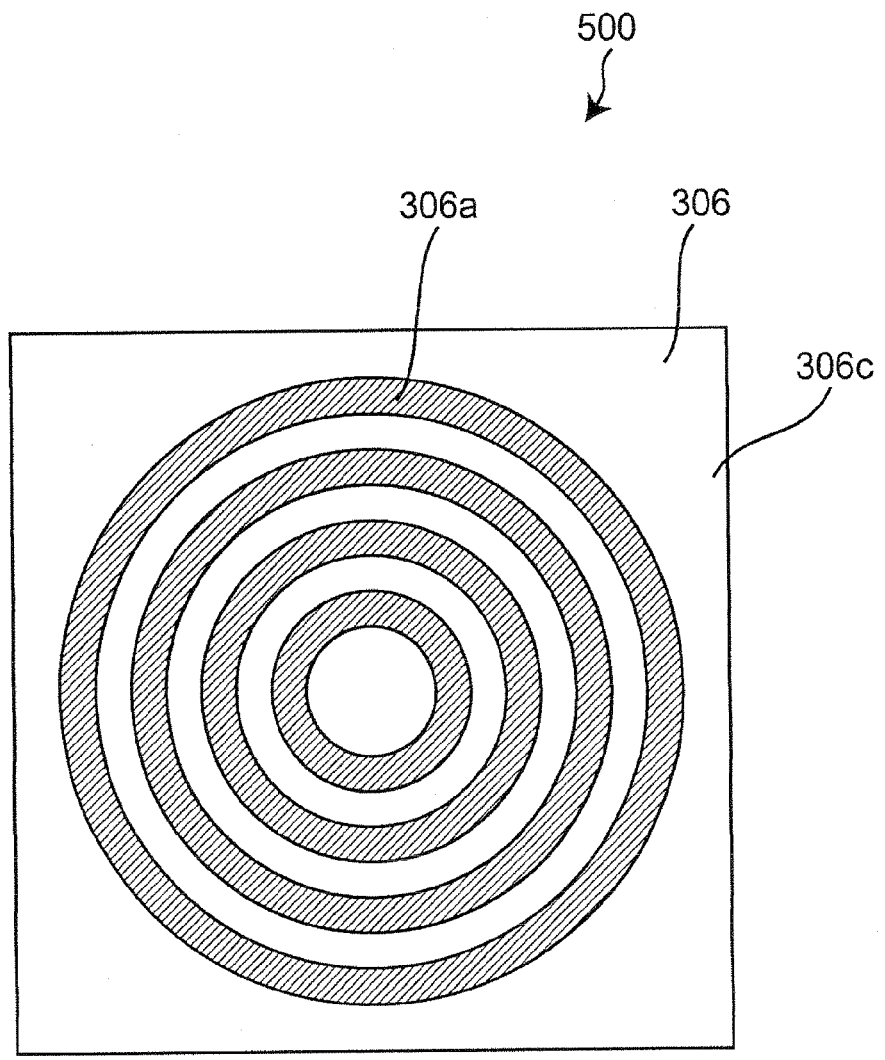
FIG. 12 is a plan view of a first dielectric layer of a ninth variation of the electret element according to the embodiment.

In the present embodiment, an example wherein the concave portions 106 (more strictly, the bottom faces 106a and the top faces 106c of the concave portions) have a rectangular shape and are disposed parallel to each other as shown in FIG. 2 is illustrated. In a ninth variation, a plurality of concave portions 306 may be formed in a first dielectric layer 506 such that a plurality of bottom faces 306 and a plurality of top faces 306c are concentric in one single electret element 500 as shown in FIG. 12. In this case, the outflow of electrical charge can be prevented in all the direction in the "x-y" plane. FIG. 12 and FIGS. 13 to 15 which will be described below are plan views of the element from which the second dielectric layer is removed, that is, plan views of the first dielectric layer. In these variations, the side wall of the concave portion is not inclined, but the side wall may be inclined or may be curved. Further, in FIG. 12 and FIGS. 13 to 15, the portions correspond to the bottom faces 306a, 316a, 326a and 336a are hatched for easy seeing.

Figure 13:
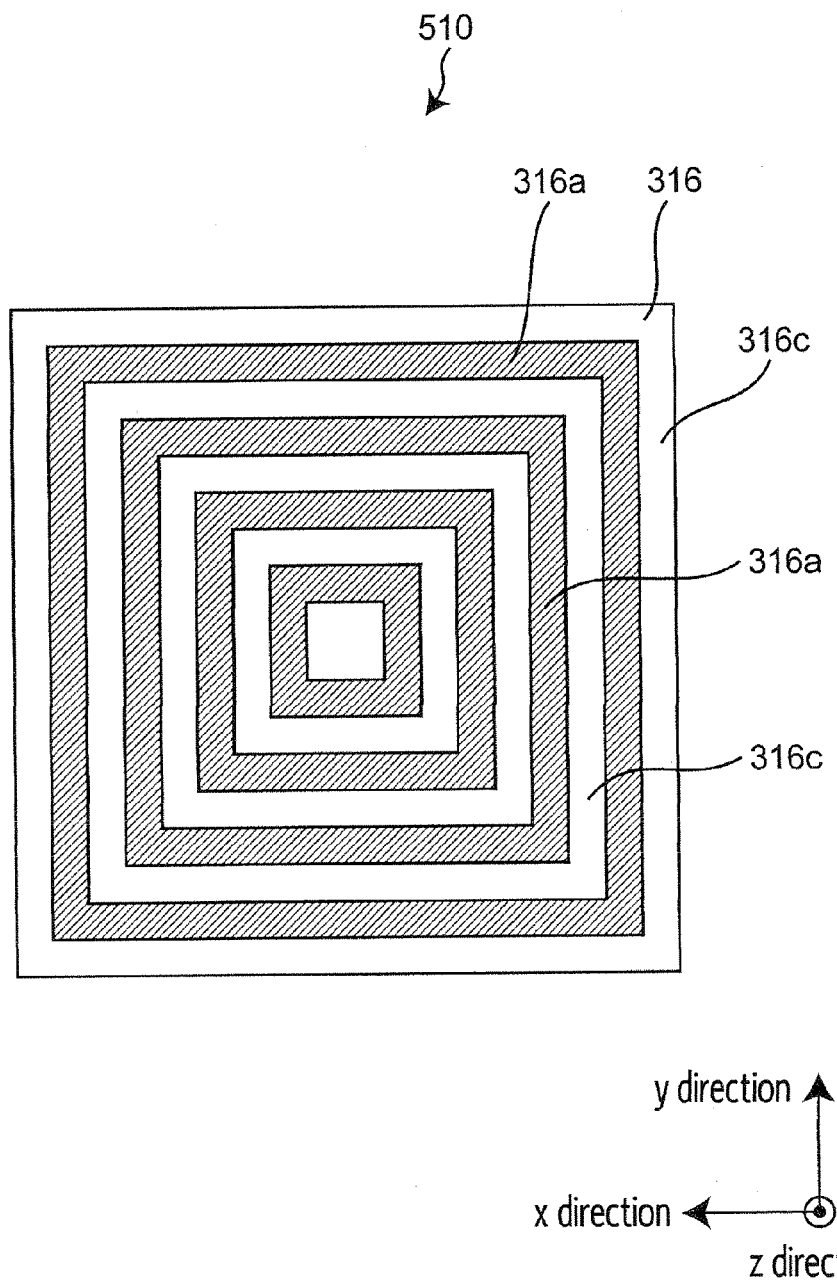
FIG. 13 is a plan view of a first dielectric layer of a tenth variation of the electret element according to the embodiment.

Alternatively, as shown in FIG. 13, a plurality of concave portions 316 which are of frame-like shape and similar figures may be formed in a first dielectric layer 316 in one single electret element 510 (a tenth variation) such that the bottom faces 316a and the top faces 316c are concentric. Such concave portions 316 can be formed by a semiconductor process using lithography more easily compared to the concave portions of concentric circles.

Figure 14:
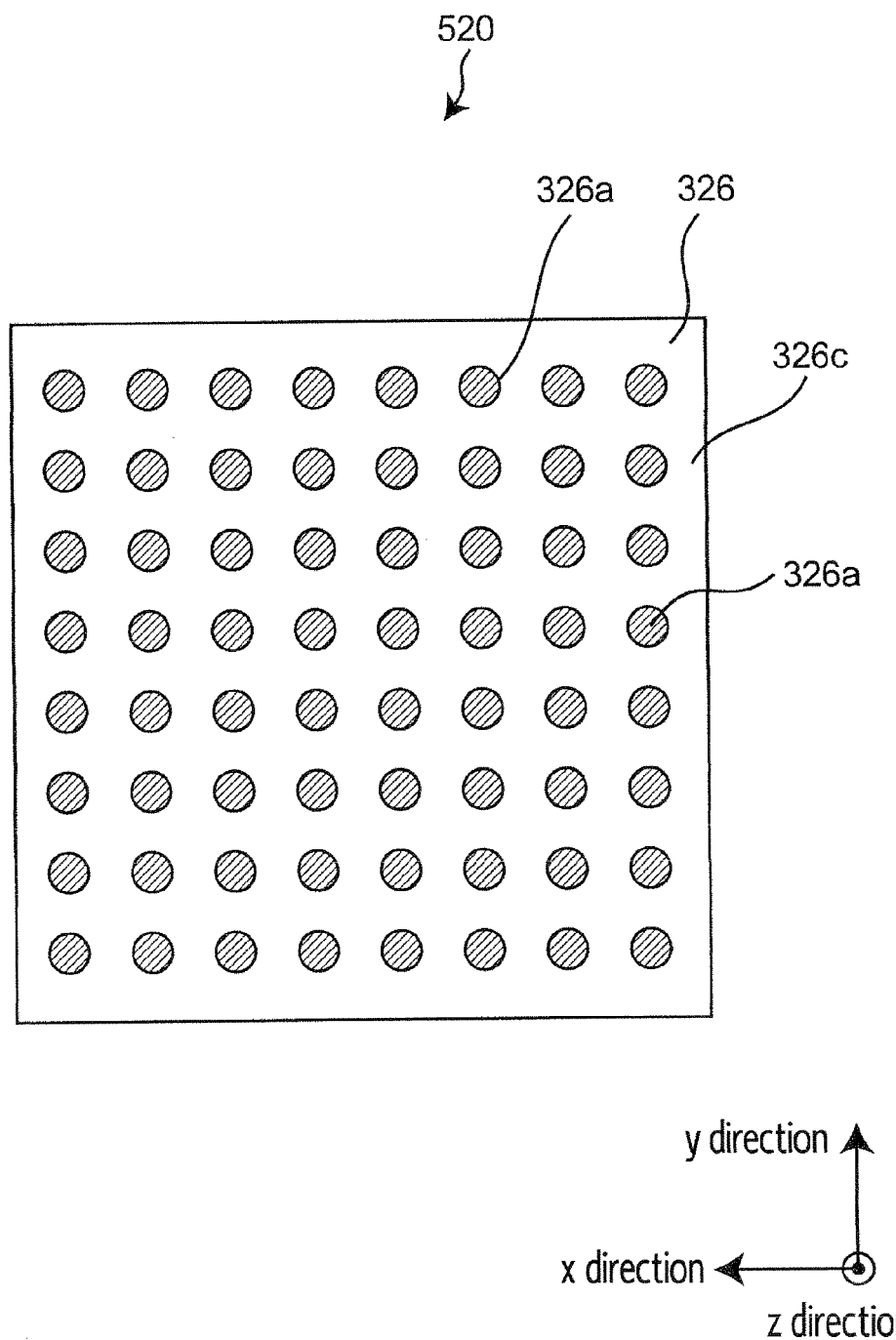
FIG. 14 is a plan view of a first dielectric layer of an eleventh variation of the electret element according to the embodiment.

Alternatively, as shown in FIG. 14, concave portions 326 may be formed in a first electret layer 326 in one single electret element 520 (an eleventh variation) such that the bottom faces 326a form dot pattern. In this configuration, the top face 326c is a plane connecting the dots 326a. When this configuration is formed by the semiconductor process using lithography, the same reticle can be used irrespective of the shapes of the first dielectric layer and the second dielectric layer. Therefore, if the pattern shapes of the first dielectric layer and the second dielectric layer are changed, there is no need to remake the reticle.

Figure 15:
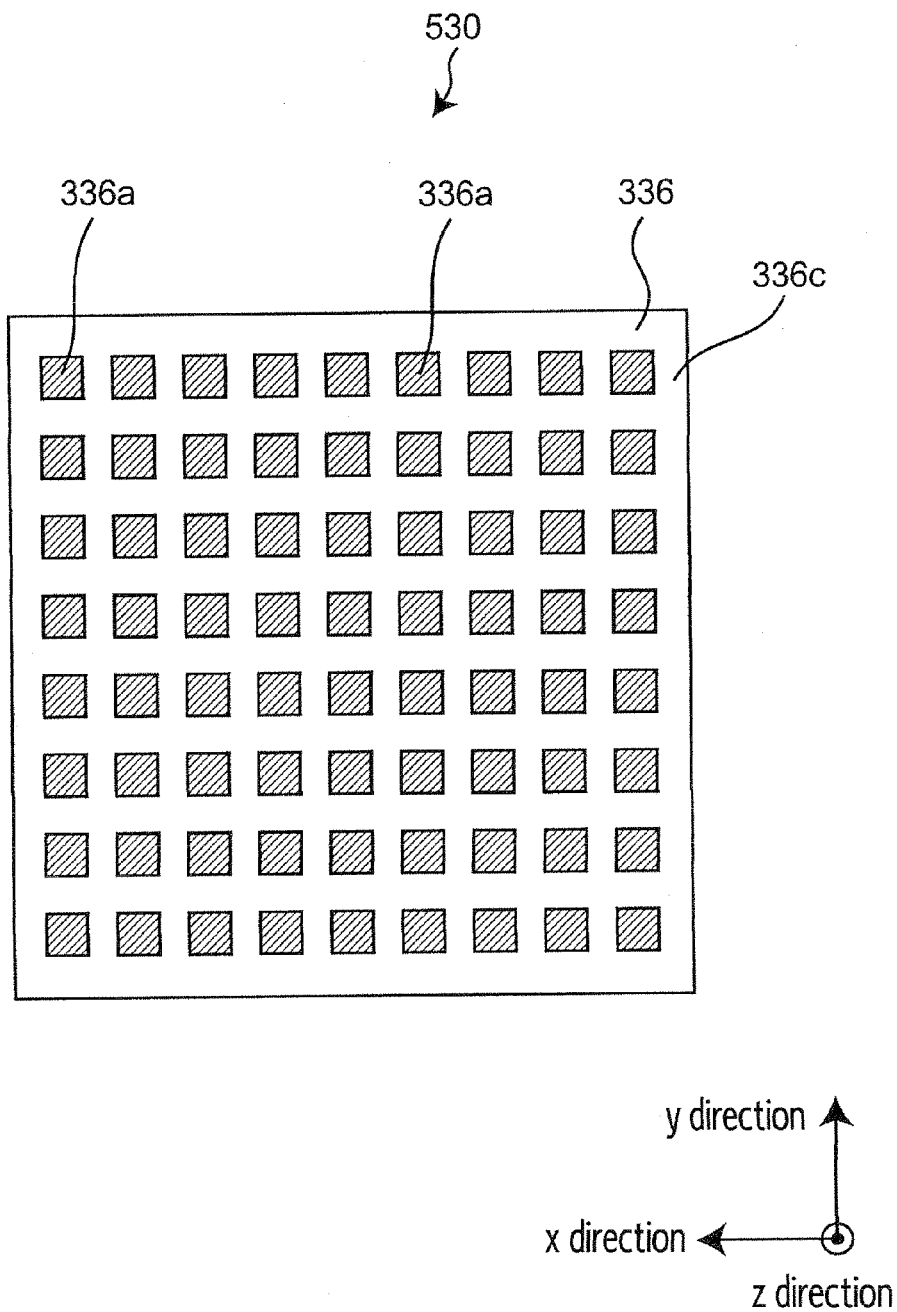
FIG. 15 is a plan view of a first dielectric layer of a twelfth variation of the electret element according to the embodiment.

Alternatively, as shown in FIG. 15, concave portions 336 may be formed in the first dielectric layer 336 in one single electret element 530 (an twelfth variation) such that square bottom faces 336a are formed regularly and the top face 336b is formed into lattice shape. Such concave portion 336 can be formed by the semiconductor process using the lithography more easily compared to the concave portion of the concentric circular.

In the present embodiment, the substrate 101 is a silicon substrate. The substrate 101 may be a sapphire substrate or a glass substrate, or a substrate of another material. When an insulative substrate (the glass substrate or the sapphire substrate) is used as the substrate 101, an electret element 650 (a thirteenth variation) does not need to have a third dielectric layer and the electrically-conductive electrode 103 may be formed on a substrate 651 as shown in FIG. 16.

In the present embodiment, the first dielectric layer 104 is a silicon oxide film and the second dielectric layer 105 is a silicon nitride film. In the case where negative electrical charge is charged in the electret layer of laminate structure wherein the first dielectric layer is disposed closer to the substrate and the second dielectric layer is disposed farther from the substrate, the second dielectric layer is not limited particularly as long as a bottom Ec of conductive band of the second dielectric layer is lower than that of the first dielectric layer. In the case where positive electrical charge is charged in the electret layer of the same structure, the second dielectric layer is not limited particularly as long as a top Ev of valence band of the second dielectric layer is higher than that of the first dielectric layer. When these two dielectric layers have energy levels satisfying these relationships, the first dielectric layer becomes a potential barrier against the electrical charge charged in the electret layer.

For example, the second dielectric layer 105 may be an aluminum oxide film, a hafnium oxide film, or a titanium oxide film. These films are dielectric films against which the silicon oxide film is capable of being the potential barrier, and therefore the combination of any one of these films and the silicon oxide film can effectively improve the thermal resistance of the electret layer.

The electrically-conductive electrode 103 may be formed from a material other than polysilicon, for example, a metal material (for example, aluminum or copper). When the metal material is used, a resistivity of the electrode can be lowered. Therefore, if the electret element 100 wherein the electrically-conductive electrode is formed from the metal material is used in the vibration power generating device, the power loss due to heat generation at resistor can be reduced. As a result, the electrical charge induced by electrostatic induction can be output effectively.

Examples

Specific examples of the above-mentioned embodiment will be described as examples. It should be noted that the present invention is not restricted to the following examples.

An electret element 700 as shown in FIG. 17 was manufactured and the electrical charge-holding stability was evaluated. A silicon oxide film 704 having a thickness of 1 μm was formed on a silicon substrate 701 (thickness 675 μm) by thermal oxidation method. Further, a plurality of concave portions 706 of rectangular shape were formed in a surface of the silicon oxide film 704 which surface is on the side of the principal surface of the silicon substrate 701 by dry etching. The concave portion 706 has a bottom face 706 having a width of 5 μm, and the depth of the concave portion 706 was 350 nm, and the pitch of the bottom face 706a was 10 μm. The concave portions 706 were formed parallel to each other. A silicon nitride film 705 (having a thickness of 150 nm) was formed on the silicon oxide film 704 with concave portions 706 by the LPCVD method. Finally, HMDS was vapor-deposited as a moisture-proof layer 708 and positive electrical charge was injected in the electret layer 707 by corona discharging.

[Evaluation of Electrical Charge-Holding Stability]

Figure 18:
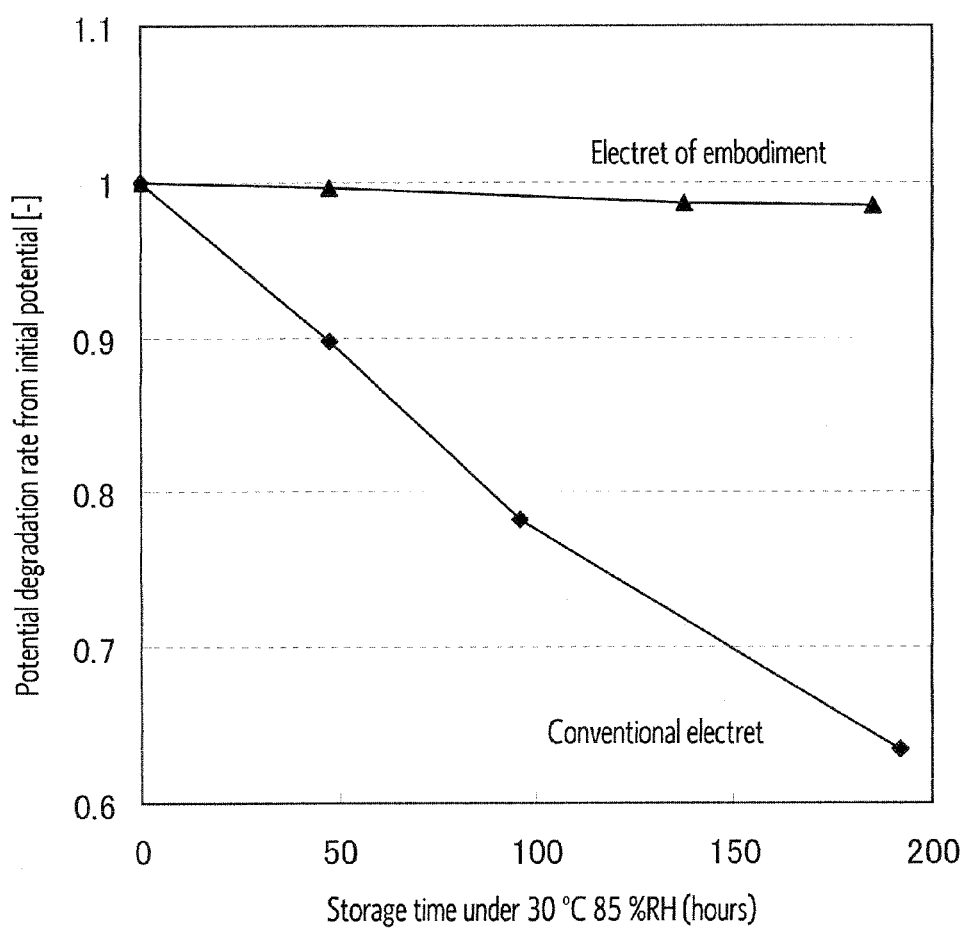
FIG. 18 is a graph showing potential degradation with time of an example in environment of high humidity (30° C. and 85% RH).
Figure 19:
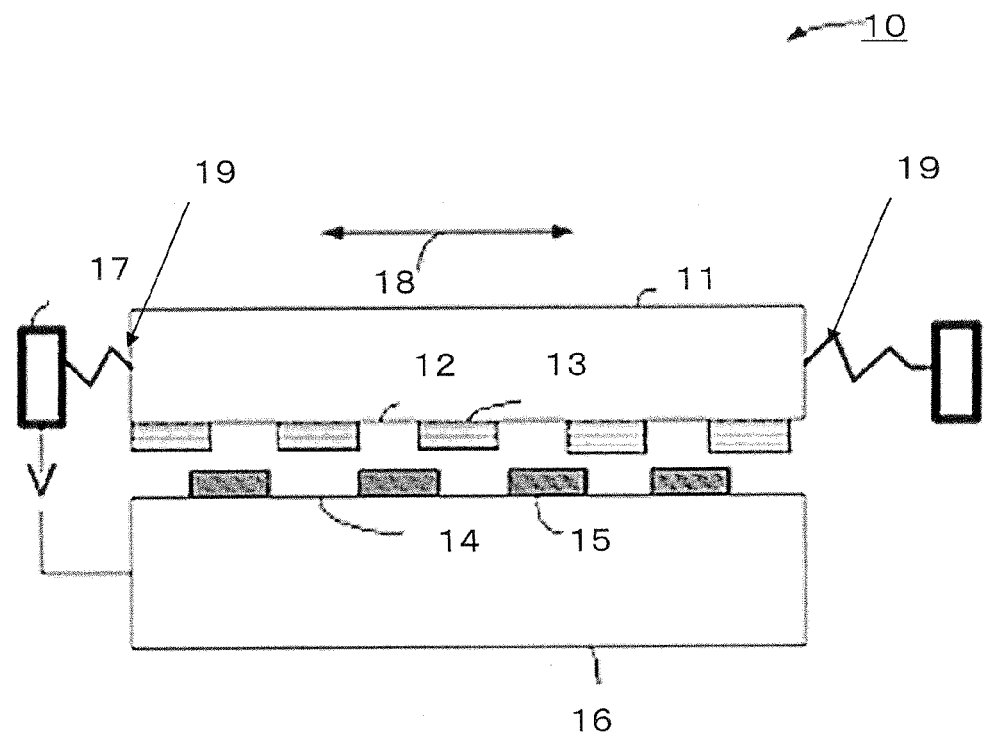
FIG. 19 is a cross-sectional view of a conventional vibration power generating device.
Figure 20:
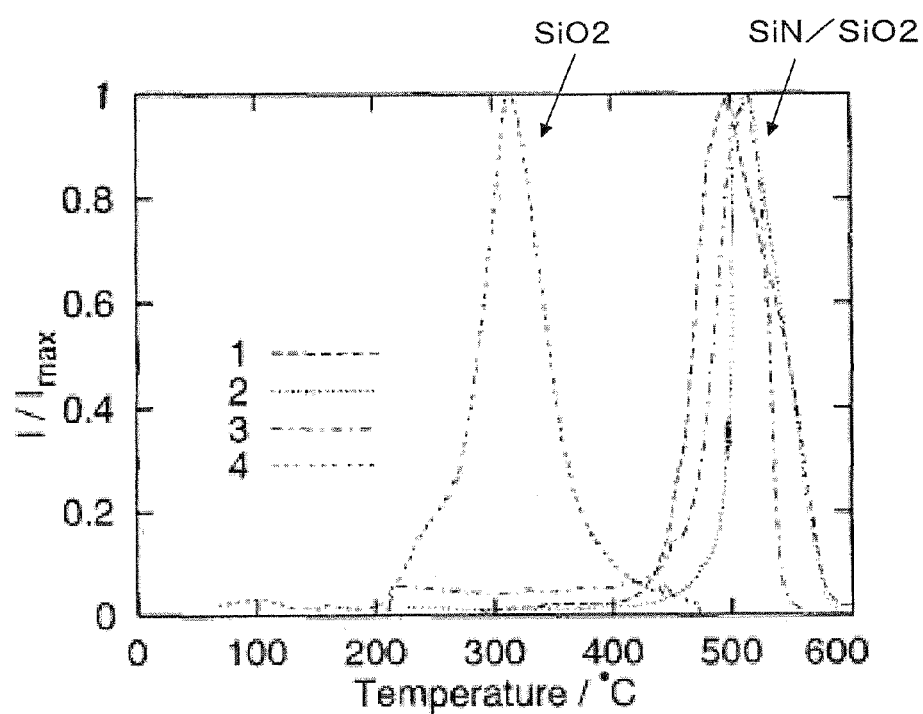
FIG. 20 is a graph showing TSC measurement results of a conventional inorganic electret consisting of a laminate of a silicon nitride film and a silicon oxide film.
Figure 21:
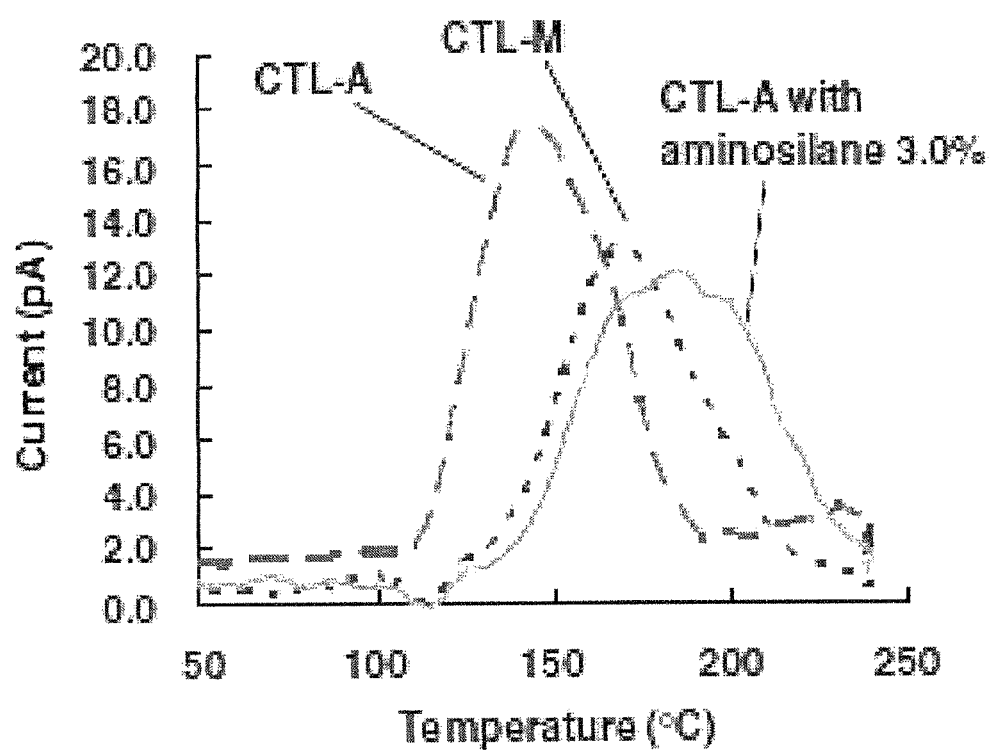
FIG. 21 is a graph showing TSC measurement results of a conventional organic electret.
Figure 22:
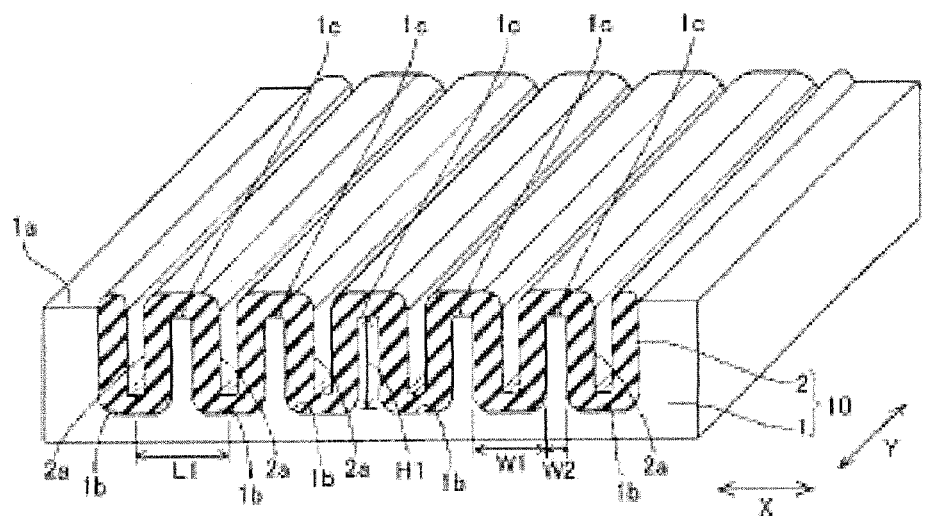
FIG. 22 is a perspective view of a conventional electret element consisting of a silicon substrate with concavo-convex structure and a silicon oxide film formed to cover the concavo-convex structure.
Figure 23:
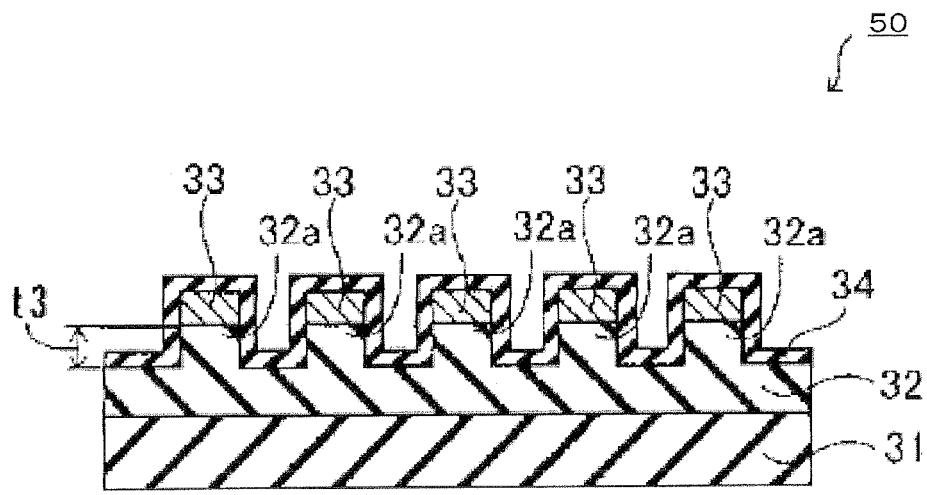
FIG. 23 is a cross-sectional view of a fixed electrode portion of a conventional electrostatic induction-type power generating device.

The electret element 700 manufactured by the above-mentioned method was stored in environment of high-humidity (30° C. and 85% RH) which accelerates the outflow of the electrical charge and the electrical charge-holding stability was evaluated. The surface potential was determined using a surface potential meter (manufactured by TREK Inc., model 347). The evaluation results are shown in FIG. 18. Comparison of the degradation rate of the surface potential after a lapse of 200 hours in the environment of high humidity relative to an initial potential was made for the electret element according to an embodiment of the present invention and the conventional electret element. The conventional electret element (having the same configuration as that of the electret element shown in FIG. 17 except that the concave portion was not formed in the first dielectric layer) showed about 35% decrease in surface potential, while the electret element of the present embodiment showed about 1% decrease in surface potential. From these results, it can be said that the electret element of the present embodiment presents higher electrical charge-holding stability compared to the conventional electret which is of the same film structure and same film thickness, but does not have the concave structure.

The embodiments illustrated in the drawings are mere examples of the embodiments. The number, shape, size and depth of the concave portions, the thickness of the dielectric layer, the amount of electrical charge held in the dielectric layer, and the shape and the number of the electrically-conductive electrodes are not limited particularly. The effect of the present embodiment can be obtained by arbitrarily selecting these factors.

Further, the above-mentioned embodiment merely exemplifies the present invention, and various modification, replacement, addition and omission may be made within the attached claims and equivalent thereof.

The electret element of the present invention has improved electrical charge-holding stability and is useful as the electret electrode for a vibration power generating device.

What is claimed is:

1. An electret element comprising a substrate, an electrically-conductive electrode, and an electret layer comprising a first dielectric layer and a second dielectric layer, wherein:
   the electret layer is capable of holding electrical charge;
   the electrically-conductive electrode is on a surface of the substrate;
   the first dielectric layer is on a surface of the electrically-conductive electrode and has, in a surface opposite to an electrically-conductive electrode-side surface, at least one concave portion having a bottom face, a side wall and a top face;
   the second dielectric layer covers the entirety of the bottom face and at least a part of the side wall; and
   a bottom Ec of a conductive band of the second dielectric layer is lower than a bottom Ec of a conductive band of the first dielectric layer, or a top Ev of a valence band of the second dielectric layer is higher than a top Ev of a valence band of the first dielectric layer, wherein
   a thickness of the first dielectric layer between the bottom face and the surface of the electrically-conductive electrode is thinner than a thickness of the first dielectric layer between the top face and the surface of the electrically-conductive electrode.

2. The electret element according to claim 1, wherein the electret layer further comprises at least one dielectric layer and the at least one dielectric layer is between the electrically-conductive electrode and the first dielectric layer.

3. The electret element according to claim 1, wherein the electrical charge is held in the electret layer and the electrically-conductive electrode is connected to:
   a potential which is of a same polarity as that of the electrical charge and has an absolute value being smaller than the absolute value of a surface potential of the electret layer; or
   a potential which is of a polarity different from that of the electrical charge.

4. The electret element according to claim 1, wherein the electrically-conductive electrode is connected to an earth potential.

5. The electret element according to claim 1, wherein the first dielectric layer is a silicon oxide film and the second dielectric layer is a film selected from the group consisting of a silicon nitride film, an aluminum oxide film, a hafnium oxide film and a titanium oxide film.

6. The electret element according to claim 1, further comprising a third dielectric layer, wherein the substrate is an electrically-conductive substrate and the third dielectric layer is between the electrically-conductive substrate and the electrically-conductive electrode.

7. The electret element according to claim 6, wherein the electrically-conductive substrate is a silicon substrate, the third dielectric layer is a silicon oxide film and the electrically-conductive electrode consists of polycrystalline silicon.

8. The electret element according to claim 1, wherein the substrate is an insulative substrate.

9. The electret element according claim 8, wherein the insulative substrate is a glass substrate or a sapphire substrate, and the electrically-conductive electrode consists of a material selected from the group consisting of polycrystalline silicon, aluminum and copper.

10. The electret element according to claim 1 wherein an electrically-conductive substrate is substituted for the substrate and the electrically-conductive electrode, and the first dielectric layer is on a surface of the electrically-conductive substrate.

11. The electret element according to claim 10, wherein the electrical charge is held in the electret layer and the electrically-conductive substrate is connected to:
  a potential which is of a same polarity as that of the electrical charge and has an absolute value being smaller than the absolute value of a surface potential of the electret layer; or
  a potential which is of a polarity different from that of the electrical charge.

12. The electret element according to claim 10, wherein the electrically-conductive substrate is connected to an earth potential.

13. The electret element according to claim 1, wherein a depth from the top face to the bottom face of the at least one concave portion is larger than a thickness of the second dielectric layer.

14. The electret element according to claim 1, wherein the at least one concave portion includes a plurality of the concave portions, and an interval between two adjacent concave portions of the plurality of concave portions is larger than a thickness of the first dielectric layer.

15. The electret element according to claim 1, further comprising a moisture-proof layer, wherein the moisture-proof layer covers:
  a surface of the second dielectric layer; or
  the surface of the second dielectric layer and a region of the surface of the first dielectric layer, which region is not covered with the second dielectric layer.

16. A vibration power generating device which is provided with the electret element according to claim 1.

17. The electret element according to claim 1, wherein the side wall is inclined or curved.

18. The electret element according to claim 1, further comprising an interface between the first dielectric layer and the second dielectric layer, wherein the interface extends in a direction away from the electrically-conductive electrode at the side wall of the at least one concave portion, such that in operation, when the electrical charge tries to move along the interface between the first dielectric layer and the second dielectric layer in the direction away from the electrically-conductive electrode, the electrical charge is drawn to the electrically-conductive electrode by electrostatic force.

19. The electret element according to claim 1, further comprising an interface between the first dielectric layer and the second dielectric layer, wherein, in operation, electrostatic force attracts the electrical charge to the bottom region of the at least one concave portion.

20. The electret element according to claim 1, wherein a top region of the at least one concave portion is wider than a bottom region of the at least one concave portion.

21. The electret element according to claim 1, wherein an interface between the electrically-conductive electrode and the first dielectric layer is flat.

* * * * *